May 21, 1963 L. S. CORCORAN 3,090,524

SHOT AND POWDER MEASURING DISPENSER

Filed Sept. 22, 1960

INVENTOR.
LYLE S. CORCORAN
BY
Lynn H. Latta
ATTORNEY

United States Patent Office 3,090,524
Patented May 21, 1963

3,090,524
SHOT AND POWDER MEASURING DISPENSER
Lyle S. Corcoran, 6116 Hollywood Blvd.,
Hollywood 28, Calif.
Filed Sept. 22, 1960, Ser. No. 57,704
7 Claims. (Cl. 222—46)

This invention relates to shot and powder measuring dispensers of the general type disclosed in my prior Patent No. 2,778,528, issued January 22, 1957, for Shot Measuring Device. The general object of this invention is to provide improvements in the dispenser disclosed and covered by that patent.

More specifically, the invention relates to measuring dispensers of the type embodying a casing having a hopper at its upper end and, at its lower end, a discharge nozzle through which the shot is delivered into a shot gun shell; and utilizing a rotatable core having a circular periphery, having a measuring pocket, and having a mouth disposed in the periphery and adapted to be alternately registered with the outlet throat of the hopper and the mouth of the discharge nozzle.

A major problem involved in the operation of a rotary core type shot measuring dispenser is that of avoiding jamming of a spherical lead shot pellet between an advancing edge of the mouth of the measuring chamber and an opposed edge of the hopper outlet. A problem presenting some difficulty in the use of such a device for powder measurement is that of leakage between the rotatable core and the casing. A particular object of this invention is to provide an improved construction and arrangement of rotatable core and casing which eliminates jamming of shot and leakage of powder. To this end, the invention attains an improved, tighter fit between the rotatable core and the casing and an improved circumferential geometry between the periphery of the rotatable core and the casing, for minimizing shot-jamming.

A further object is to provide a shot and powder measure having an improved means for adjusting and indicating the volume of the measuring chamber with a high degree of accuracy.

Other objects and advantages will become apparent in the ensuing specifications and appended drawing, in which.

Figure 1:
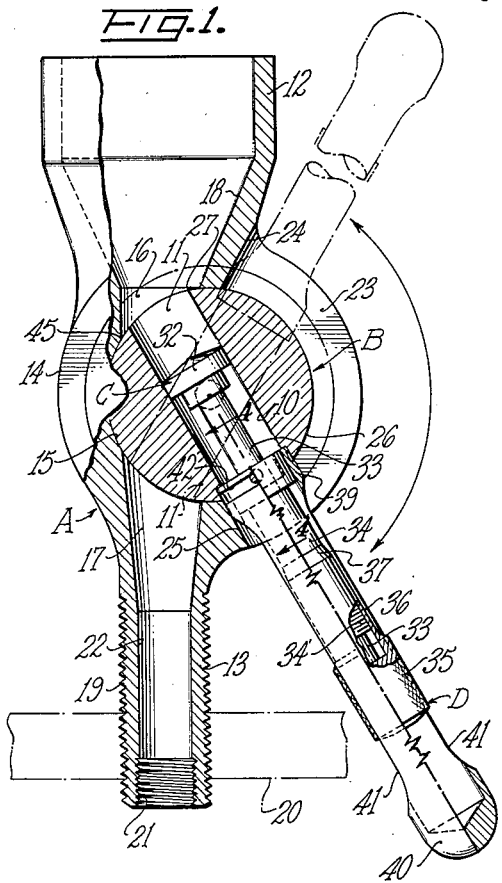
FIG. 1 is a vertical sectional view of a measuring dispenser embodying my invention.

Referring now to the drawing in detail, I have shown therein, as an example of one form in which my invention may be embodied, a dispenser which may be used for measuring shot or powder for loading a shot gun shell or bullet cartridge. In general, the dispenser comprises a casing A, a core B rotatably mounted in the casing A and having a diametral bore 10 which provides a measuring pocket 11 to receive and measure a charge of shot or powder; an adjustable plug C defining the bottom of the metering pocket; and a combined handle and adjusting means D having parts attached to the core B and plug C respectively for oscillating the core B in measuring and dispensing operations and for sliding the plug C to selected positions of adjustment along the axis of bore 10 to adjust the depth of the measuring pocket 11.

The casing A, which may be fabricated as an integral casting (e.g. cast iron) comprises a hopper 12 at its upper end, a combined mounting and delivery nozzle 13 at its lower end, coaxial with hopper 12 on a vertical axis, and an intermediate bearing boss 14 disposed between the hopper 12 and nozzle 13. Boss 14 is of circular cross section around an operational axis which is transverse to the common vertical axis of hopper 12 and nozzle 13 and is disposed eccentrically thereof, spaced from said vertical axis on the side of the handle assembly D. Boss 14 has a frusto-conical internal bearing wall which defines a chamber 15 in which the rotor B is mounted for rotary movement between a loading position in which measuring pocket 11 communicates with an outlet throat 16 at the lower end of hopper 12, and a discharge position, shown in broken lines in FIG. 1, wherein the pocket 11 communicates with a receiving mouth 17 extending from the chamber 15 to the nozzle 13. Hopper 12 has an open upper end of maximum diameter for filling purposes, and a frusto-conical funnel portion 18 converging downwardly to the diameter of throat 16 which may be a cylindrical bore extending from the bottom of funnel portion 18 to the core chamber 15.

Nozzle 13 is externally threaded, at 19, for mounting the dispenser in a threaded bore in a support 20 of a shell or cartridge loading apparatus, and at its lower end has an internally threaded counterbore 21 into which a nozzle tip of reduced outlet diameter may be inserted for loading powder into small caliber cartridges. Nozzle 13 has a cylindrical bore 22 extending from the mouth 17 to the counterbore 21. Mouth 17 is frusto-conical, with a slight upward flare such that its upper end has a width (parallel to the operational axis) at least equal to the diameter of the measuring pocket 11 and preferably slightly larger, so as to insure the free discharge of shot pellets from the measuring pocket 11 into the mouth 17 without interference.

On its extended side (most distant from the vertical hopper-nozzle axis) the boss 14 is provided with an arcuate slot 23 which extends from an upper stop wall 24 at the side of the funnel portion 18 of hopper 12 to a lower stop wall 25 adjacent the junction between nozzle 13 and boss 14. The width of slot 23, parallel to the operational axis, is slightly greater than the maximum diameter of handle assembly D, which passes through the slot 23 with clearance for free vertical swinging movement between the loading and delivery positions referred to above. Engagement of the handle against the lower stop wall 25 determines the loading position shown in full lines in FIG. 1. Engagement of the handle assembly D against the upper stop wall 24 determines the discharge position. The eccentricity of the operational axis with respect to the vertical hopper-nozzle axis is such that the bearing wall 15 on the side remote from slot 23 approaches tangency to the adjacent sides of hopper throat 16 and nozzle mouth 17, the depth to which bearing wall 15 indents the boss 14 past these adjacent sides of throat 16 and mouth 17 being approximately such that the open end of measuring pocket 11 will be centered within the slightly larger diameters of throat 16 and mouth 17 in the respective loading and discharge positions, where the core B is rotated through approximately 120° total arc of movement. The longitudinal axis of handle assembly D subtends approximately 30° angles with respect to the vertical hopper-nozzle axis, both in the loading and discharge positions. The resultant 30° inclination of the axis of measuring pocket 11 with respect to the vertical assures ample movement of shot and powder into the pocket 11 when the core B is in the loading position; and free discharge out of the pocket 11 into the mouth 17 when the core B is in the discharge position. The approximately 120° ambit of rotary movement of the core B is desirable in order to provide such freedom of movement into and out of the measuring pocket and the eccentricity of the bearing wall 15 is such as to provide that amount of arcuate swinging movement.

Core B is a solid body of appropriately rigid material such as cast iron, brass, hard, rigid synthetic resin plastic material, or any equivalent material. Bore 11 extends diametrically therethrough between opposite points on the conical peripheral wall 26 thereof, and intersects said wall in a generally circular lip 27 to define the mouth of the measuring pocket 11. Core B has generally parallel end walls, the end wall 28 at its smaller end being preferably flat and disposed in a plane spaced inwardly slightly from the adjacent annular side face of the casing A. A flat washer 29 of spring metal has a peripheral portion of substantial area bearing against said annular side face of the casing A and its central aperture is disposed concentric with the rotational axis of core B. Core B has an integral (or rigidly secured) threaded stud 30 which projects through the central aperture of washer 29 and is secured by a nut 31 threaded thereon. Nut 31 is of the self locking type, locking itself to the thread of stud 30. When adjusted to a selected position of adjustment in which it bears against the central area of the outer face of washer 29 in compression, it develops in the washer 29 a spring loading the reactive force of which is applied to the stud 30 in tension through the nut 31 and is effective to draw the core B snugly into the chamber 15, causing the peripheral wall 26 of the core B to bear tightly against the wall of chamber 15, with a spring loading which is determined by the position of adjustment of nut 31 on stud 30. Thus the core B is constantly retained in tight contact with the wall of chamber 15 and yet is free for rotation under moderate force applied through handle assembly D. The frictional engagement of the core B against the casing A, while insufficient to cause difficulty in the operation of the apparatus, is yet enough to hold the core and handle D in any position to which it may be moved, and to maintain a sufficient seal between the peripheral wall 26 of core B and the wall of chamber 15 to prevent grains of powder creeping into the crevice between these coacting surfaces.

The frusto-conical peripheral wall 26 of core B is hardened, machined and polished, and preferably chrome-plated to provide a tight fit combined with smooth and easy rotation of the core in the casing. The fit is sufficiently tight to prevent powder grains from entering the crevice between the core and the chamber 15. The self locking nut 31 provides a constant spring loading of the core surface 26 against the wall of chamber 15, without any tendency to loosen during repeated oscillations of the core. The washer 29 will remain stationary, in fixed relation to the casing A because of its relatively large area of frictional bearing engagement therewith, while the nut 31 will remain in fixed relation to stud 30 and will turn against the washer 29.

Core B has at one end of the bore 11, a shallow counterbore in which the inner end of handle assembly D is secured for attaching the handle assembly to the core to transmit rotation thereto.

Plug C is in the form of a piston comprising a cylindrical head 32 having a short integral hub in which is secured (or swivelled) one end of an adjustment stem 33. The cylindrical periphery of head 32 is fitted in bore 10 snugly (sufficiently to block passage of powder grains, but with sufficient clearance to be freely slidable therein).

Figure 2:
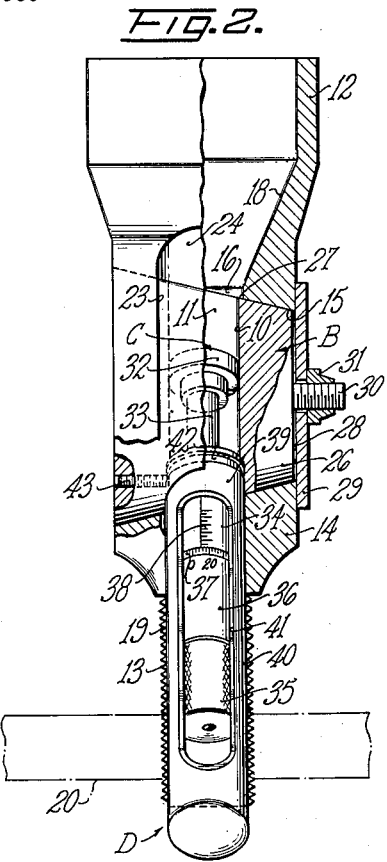
FIG. 2 is an elevational view looking at the handle side of the dispenser, partially in vertical section.
Figure 3:
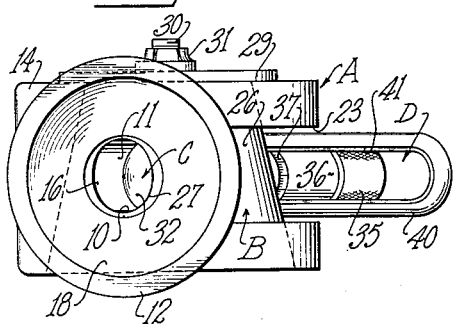
FIG. 3 is a plan view of the dispenser.
Figure 4:
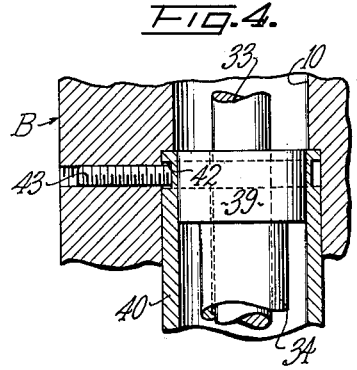
FIG. 4 is a detail sectional view taken on the line 4—4 of FIG. 1.

Handle assembly D is in essence a micrometer assembly of improved construction in combination with the core B and casing A, and comprises the stem 33, a dial tube 34 through which the stem 33 extends, an actuator knob 35 to which the outer end of stem 33 is attached, a skirt 36 secured to or integral with knob 35 and projecting forwardly in telescoping relation to the dial tube 34, a vernier scale 37 (FIG. 2) on the forward end of skirt 36 and a linear scale 38 on the dial tube 34, extending longitudinally thereof. In accordance with conventional micrometer construction, the skirt 36 has an internal thread meshing with an external thread 34' on the dial tube 34 and related to the scales 37 and 38 in a manner such that the scales will indicate (in coarse divisions on scale 38 and in fine divisions on vernier scale 37) the exact position of plug 32 within the bore 10 as determined by the pitch of the screw threads and the number of turns and partial turns imparted to the skirt 36 by rotation of knob 35. The scale 38 may be established in terms of the depth of pocket 11 (as defined by the position of bottom plug 32) or in terms of the volume of pocket 11, this being an optional matter.

The handle D, in addition to the above described micrometer mechanism, includes a handle lever 40 of slotted tubular construction having an inner end 39 of collar form which is mounted in the above mentioned counterbore at the rear end of the bore 10 in core B. A pair of diametrically opposed slots 41 extend longitudinally in opposite (upper and lower) sides of the handle lever 40, and are of sufficient width so that the opposite sides of knurled knob 35 will project outwardly beyond the edges of the lever 40 along the margins of slots 41, so that the knob 35 can readily be grasped between the finger tips.

In the inner end portion 39 of the handle lever 40 is an annular groove 42, disposed within the counterbore of core B and secured by a set screw 43 which is threaded through the large end of the core B and has its point engaged in the groove 42, to secure the handle sleeve 40 in the counterbore. Thus the handle assembly D is fastened to the core B for transmitting oscillating movement thereto in the operation of the apparatus.

The knurled micrometer knob 35 has opposite side portions thereof projecting through the respective slots 41 for engagement by the finger tips for adjusting the setting of plug C. The micrometer skirt 36 is telescoped over the dial tube 34 and is journalled thereon, with the above mentioned conventional micrometer threaded connection between the sleeve 36 and tube 34 to effect longitudinal adjustment of the sleeve 36 on the tube 34 when the knob 35 is rotated. Since such micrometer construction is well known in the micrometer art, it is not herein illustrated in detail.

The eccentric location of the core B with respect to casing A makes it possible to attain a full 120° of swing of the handle assembly D. Also, it provides an improved relationship between the mouth edge 27 of the measuring pocket 11 and the corner 45 which is defined between the throat 16 and the wall of the core chamber 15 on the side of throat 16 toward which the lip 27 moves when the core B is rotating from its loading to its discharge position, filled with shot or powder. The eccentricity of the core B provides for maximum obtuseness in the corner 45, with the result that there is a reduced likelihood of a shot pellet being engaged with a shearing or crushing action between the lip 27 and the wall of the throat and the corner 45.

I claim:

1. An adjustable shot and powder measuring dispenser comprising: a casing including a hopper at its upper end, a discharge nozzle at its lower end, and an annular boss integrally joining said hopper to said discharge nozzle and having an internal wall defining a core chamber of circular cross section, said hopper having at its lower end a throat communicating with said chamber and said nozzle having at its upper end a mouth communicating with said chamber; a rotary core having a peripheral wall fitted to said chamber and having a diametral bore; a plug fitted in said diametral bore, a measuring pocket, of which said plug provides the bottom, being defined in one end of said bore and having at its peripheral wall, a mouth adapted to register selectively with said hopper throat in a loading position and with said nozzle mouth in a discharge position; and handle means attached to the periphery of said core and projecting radially therefrom; said boss having an eccentric side at a greater distance from the axes of said hopper and nozzle than the distance between said axes and the opposite side of the casing, said casing having in said eccentric side thereof an arcuate slot through which said handle means extend for vertical movement for oscillating said core between said discharge and loading positions, said casing, at the respective ends of said arcuate slot, defining stops for engagement by said handle means to determine said positions; said plug being slidably fitted in said diametral bore; said handle means comprising a handle lever of sleeve form secured at one end to the periphery of said plug in registration with the end of said bore opposite said pocket, said handle lever projecting radially from the core and having diametrically opposed longitudinally extending slots in respective sides thereof, a dial tube secured in the forward end of said handle lever and projecting rearwardly therein in coaxial relation thereto, said tube having a linear micrometer scale thereon, a stem secured to said head and projecting rearwardly through said dial tube, a knob secured to the rear end of said stem and having respective sides exposed in the respective longitudinal slots of said handle lever, and a micrometer skirt on said knob, projecting forwardly therefrom in telescoped relation to and in threaded engagement with said dial tube, said skirt having at its forward end, indicator means cooperating with said linear scale to indicate the volume of said measuring pocket as determined by the setting of said plug which in turn is determined by the threaded adjustment of said skirt on said dial tube.

2. A shot and powder measuring dispenser comprising: a casing including a hopper at its upper end, a discharge nozzle at its lower end, and an annular boss integrally joining said hopper to said discharge nozzle, said casing having a frusto conical internal wall defining a core chamber, said boss having opposite side faces intersected by the respective ends of said chamber wall, the side face at the smaller end of the chamber including a flat annular bearing wall encircling said smaller end of the chamber; said hopper having at its lower end a throat communicating with said chamber and said nozzle having at its upper end a mouth communicating with said chamber; a rotary core having a frusto-conical peripheral wall fitted to said chamber wall, having a smaller end provided with an end wall spaced inwardly from the plane of said annular bearing wall of the casing, and having a threaded stud projecting axially from said small end upon its rotational axis; a spring washer covering the small end of said core chamber in opposed relation to said end wall of the core and having a peripheral portion of its inner face bearing against said annular bearing wall of the casing; a lock nut threaded upon said core stud and adjustably bearing against the center of said washer for spring loading said core with its peripheral wall in snug bearing engagement with said chamber wall; said core being provided with a generally diametral measuring pocket having a bottom and having at the peripheral wall of the core, a mouth adapted to register selectively with said hopper throat and said nozzle mouth; and handle means secured to the periphery of said core and projecting radially therefrom; said boss having in a side thereof an arcuate slot through which said handle means projects; said casing, at the upper and lower ends of said slot, providing stops against which said handle means is engageable to determine said loading and discharge positions.

3. An adjustable shot and powder measuring dispenser comprising: a casing including a hopper at its upper end, a discharge nozzle at its lower end, aligned with said hopper on a vertical axis, said hopper having at its lower end a throat communicating with said chamber and said nozzle having at its upper end a mouth communicating with said chamber, and an annular boss integrally joining said hopper to said discharge nozzle and having an internal wall defining a core chamber of circular cross section having an axis transverse to and spaced laterally from said vertical axis, said boss having opposed side faces intersected by the respective ends of said chamber wall, the side face at the smaller end of the chamber including a flat annular bearing wall encircling said small end of the chamber; a rotary core having a frusto conical peripheral wall fitted to said chamber wall, having a smaller end provided with an end wall spaced inwardly from the plane of said annular bearing wall of the casing, and having a stud projecting axially from said small end wall upon its rotational axis, said core having a diametral bore the axis of which lies in a common vertical plane with said vertical casing axis; means attached to said stud and bearing against said annular bearing wall and axially positioning said core in said core chamber; a plug slidably fitted in said diametral bore, a measuring pocket, of which said plug provides the bottom, being defined in one end of said bore and having at said peripheral wall of the core, a mouth adapted to register selectively with said hopper throat and said nozzle mouth; a handle lever secured at one end to the periphery of said core in registration with the end of said bore opposite said pocket, said handle lever projecting radially from the core, being in the form of a sleeve having a longitudinally extending slot; a knob secured to said plug and having a side thereof exposed in said longitudinal slot; and micrometer means comprising a threaded connection between said knob and said handle lever, and indicator means attached to said knob and handle lever respectively and comprising a linear micrometer scale and an indicator part cooperating with said linear scale to indicate the volume of said measuring pocket as determined by the setting of said plug which in turn is indicated by the threaded adjustment of said micrometer parts; said boss having an eccentric side at a greater distance from said vertical casing axis than its opposite side and having in said eccentric side an arcuate slot disposed in a plane normal to the axis of rotation of said core, through which said handle lever extends, the inner end of said handle lever being engageable against the upper and lower ends of said slot to determine respectively the discharge and loading positions of said core, said pocket registering with said hopper throat at the loading position and with said nozzle mouth at the discharge position.

4. An adjustable shot and powder measuring dispenser comprising: a casing including a hopper at its upper end, a discharge nozzle at its lower end, aligned with said hopper on a vertical axis, said hopper having at its lower end a throat communicating with said chamber and said nozzle having at its upper end a mouth communicating with said chamber, and an annular boss integrally joining said hopper to said discharge nozzle and having a frusto conical internal wall defining a core chamber having an axis transverse to and spaced laterally from said vertical axis, said boss having opposed side faces intersected by the respective ends of said chamber wall, the side face at the smaller end of the chamber including a flat annular bearing wall encircling said small end of the chamber; a rotary core having a frusto conical peripheral wall fitted to said chamber wall, having a smaller end provided with an end wall spaced inwardly from the plane of said annular bearing wall of the casing, and having a stud projecting axially from said small end wall upon its rotational axis, said core having a diametral bore the axis of which lies in a common vertical plane with said vertical casing axis; a spring washer covering the small end of said core chamber in opposed relation to said end wall of the core and having a peripheral portion of its inner face bearing against said annular bearing wall of the casing; abutment means secured to said core stud and bearing against the center of said washer for spring loading said core with its peripheral wall in snug bearing engagement with said chamber wall; a plug slidably fitted in said diametral bore, a measuring pocket, of which said plug provides the bottom, being defined in one end of said bore and having at said peripheral wall of the core, a mouth adapted to register selectively with said hopper throat and said nozzle mouth; means for adjusting said plug axially in said bore for varying the volume of said pocket; and a handle lever secured at one end to the periphery of said core in registration with the end of said bore opposite said pocket, said handle lever projecting radially from the core, said boss having an eccentric side at a greater distance from said vertical casing axis than its opposite side and having in said eccentric side an arcuate slot disposed in a plane normal to the axis of rotation of said core, through which said handle lever extends, the inner end of said handle lever being engageable against the upper and lower ends of said slot to determine respectively the discharge and loading positions of said core, said pocket registering with said hopper throat at the loading position and with said nozzle mouth at the discharge position.

5. An adjustable shot and powder measuring dispenser comprising: a casing including a hopper at its upper end, a discharge nozzle at its lower end, said hopper having at its lower end a throat communicating with said chamber and said nozzle having at its upper end a mouth communicating with said chamber, and an annular boss integrally joining said hopper to said discharge nozzle and having a frusto conical internal wall defining a core chamber, said boss having opposed side faces intersected by the respective ends of said chamber wall, the side face at the smaller end of the chamber including a flat annular bearing wall encircling said small end of the chamber; a rotary core having a frusto conical peripheral wall fitted to said chamber wall, having a smaller end provided with an end wall spaced inwardly from the plane of said annular bearing wall of the casing, and having a stud projecting axially from said small end wall upon its rotational axis, said core having a diametral bore the axis of which lies in a common vertical plane with said vertical casing axis; a spring washer covering the small end of said core chamber in opposed relation to said end wall of the core and having a peripheral portion of its inner face bearing against said annular bearing wall of the casing; abutment means secured to said core stud and bearing against the center of said washer for spring loading said core with its peripheral wall in snug bearing engagement with said chamber wall; a plug slidably fitted in said diametral bore, a measuring pocket, of which said plug provides the bottom, being defined in one end of said bore and having at said peripheral wall of the core, a mouth adapted to register selectively with said hopper throat and said nozzle mouth; and a combined handle lever and micrometer assembly comprising a handle lever of sleeve form secured at one end to the periphery of said core in registration with the end of said bore opposite said pocket, said handle lever projecting radially from the core and having diametrically opposed longitudinally extending slots in respective sides thereof, a dial tube secured in the forward end of said handle lever and projecting rearwardly therein in coaxial relation thereto, said tube having a linear micrometer scale thereon, a stem secured to said head and projecting rearwardly through said dial tube, a knob secured to the rear end of said stem and having respective sides exposed in the respective longitudinal slots of said handle lever, and a micrometer skirt on said knob, projecting forwardly therefrom in telescoped relation to and in threaded engagement with said dial tube, said skirt having at its forward end, indicator means cooperating with said linear scale to indicate the volume of said measuring pocket as determined by the setting of said plug which in turn is determined by the threaded adjustment of said skirt on said dial tube; said boss having an eccentric side at a greater distance from said vertical casing axis than its opposite side and having in said eccentric side an arcuate slot disposed in a plane normal to the axis of rotation of said core, through which said handle lever extends, the inner end of said handle lever being engageable against the upper and lower ends of said slot to determine respectively the discharge and loading positions of said core, said pocket registering with said hopper throat at the loading position and with said nozzle mouth at the discharge position.

6. An adjustable shot and powder measuring dispenser comprising: a casing including a hopper at its upper end, a discharge nozzle at its lower end, aligned with said hopper on a vertical axis, said hopper having at its lower end a throat communicating with said chamber and said nozzle having at its upper end a mouth communicating with said chamber, and an annular boss integrally joining said hopper to said discharge nozzle and having a frusto-conical internal wall defining a core chamber having an axis transverse to and spaced laterally from said vertical axis, said boss having opposed side faces intersected by the respective ends of said chamber wall, the side face at the smaller end of the chamber including a flat annular bearing wall encircling said small end of the chamber; a rotary core having a frusto-conical peripheral wall fitted to said chamber wall, having a small end provided with an end wall spaced inwardly from the plane of said annular bearing wall of the casing, and having a stud projecting axially from said small end wall upon its rotational axis, said core having a diametral bore the axis of which lies in a common vertical plane with said vertical casing axis; a spring washer covering the small end of said core chamber in opposed relation to said end wall of the core and having a peripheral portion of its inner face bearing against said annular bearing wall of the casing; abutment means secured to said core stud and bearing against the center of said washer for spring loading said core with its peripheral wall in snug bearing engagement with said chamber wall; a plug slidably fitted in said diametral bore, a measuring pocket, of which said plug provides the bottom, being defined in one end of said bore and having at said peripheral wall of the core, a mouth adapted to register selectively with said hopper throat and said nozzle mouth; and a combined handle lever and micrometer assembly comprising a handle lever of sleeve form secured at one end to the periphery of said core in registration with the end of said bore opposite said pocket, said handle lever projecting radially from the core and having diametrically opposed longitudinally extending slots in respective sides thereof, a dial tube secured in the forward end of said handle lever and projecting rearwardly therein in coaxial relation thereto, said tube having a linear micrometer scale thereon, a stem secured to said head and projecting rearwardly through said dial tube, a knob secured to the rear end of said stem and having respective sides exposed in the respective longitudinal slots of said handle lever, and a micrometer skirt on said knob, projecting forwardly therefrom in telescoped relation to and in threaded engagement with said dial tube, said skirt having at its forward end, indicator means cooperating with said linear scale to indicate the volume of said measuring pocket as determined by the setting of said plug which in turn is determined by the threaded adjustment of said skirt on said dial tube; said boss having an eccentric side at a greater distance from said vertical casing axis than its opposite side and having in said eccentric side an arcuate slot disposed in a plane normal to the axis of rotation of said core, through which said handle lever extends, the inner end of said handle lever being engageable against the upper and lower ends of said slot to determine respectively the discharge and loading positions of said core, said pocket registering with said hopper throat at the loading position and with said nozzle mouth at the discharge position.

7. An adjustable shot and powder measuring dispenser comprising: a casing including a hopper at its upper end, a discharge nozzle at its lower end, and an annular boss integrally joining said hopper to said discharge nozzle and having an internal wall defining a core chamber of circular cross section, said hopper having at its lower end a throat communicating with said chamber and said nozzle having at its upper end a mouth communicating with said chamber; a rotary core having a peripheral wall fitted to said chamber and having a diametral bore; said core being provided with a generally diametral bore having at the peripheral wall, a mouth adapted to register selectively with said hopper throat in a loading position and with said nozzle mouth in a discharge position; a plug slidably fitted in said bore, a measuring pocket, of which said plug provides the bottom, being defined in the end of said bore opposite said mouth; and handle means attached to the periphery of said core and projecting radially therefrom; said boss having an eccentric side at greater distance from the axes of said hopper and nozzle than the distance between said axes and the opposite side of the casing, said casing having in said eccentric side thereof an arcuate slot through which said handle means extend for vertical movement for oscillating said core between said discharge and loading positions, said casing, at the respective ends of said arcuate slot, defining stops for engagement by said handle means to determine said positions; said handle means comprising a handle lever of sleeve form secured at one end to the periphery of said core in registration with the end of said bore opposite said measuring pocket, said handle lever having therein a longitudinally extending slot, a knob secured to said plug and having a side thereof exposed in said longitudinal slot, and cooperative micrometer parts attached to said knob and to said handle lever respectively and in threaded engagement with one another, one of said parts having indicator means cooperating with said linear scale to indicate the volume of said measuring pocket as determined by the setting of said plug which in turn is indicated by the threaded adjustment of said micrometer parts.

References Cited in the file of this patent

UNITED STATES PATENTS

| | | |
|---|---|---|
| 221,104 | Rykard | Oct. 28, 1879 |
| 1,563,756 | Liberman | Dec. 1, 1925 |
| 1,577,235 | Hucks | Mar. 16, 1926 |
| 2,550,827 | Lachmiller | May 1, 1951 |
| 2,778,528 | Corcoran | Jan. 22, 1957 |